L. KERCHER.
EXCAVATING AND LOADING MACHINE.
APPLICATION FILED JUNE 21, 1909.
971,540.
Patented Oct. 4, 1910.
8 SHEETS—SHEET 3.
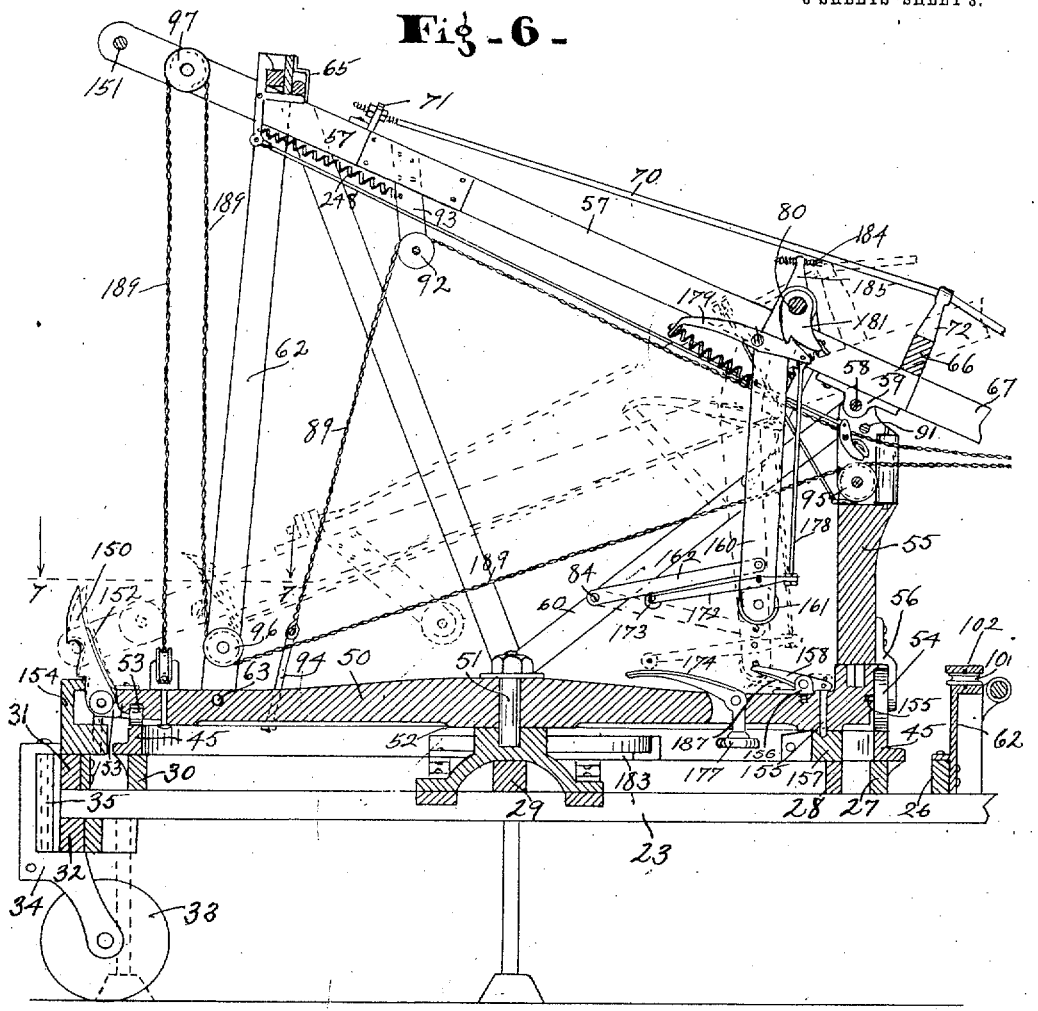
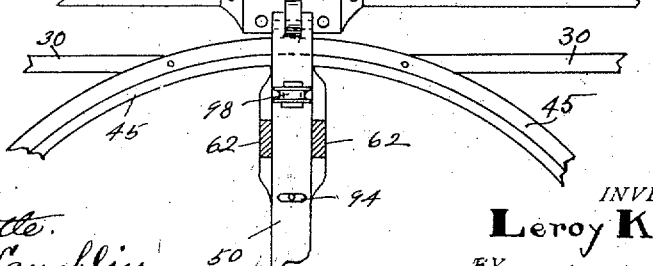
WITNESSES:
W. M. Gentle.
O. M. McLaughlin.
INVENTOR.
Leroy Kercher.
BY V. H. Lockwood
ATTORNEY.

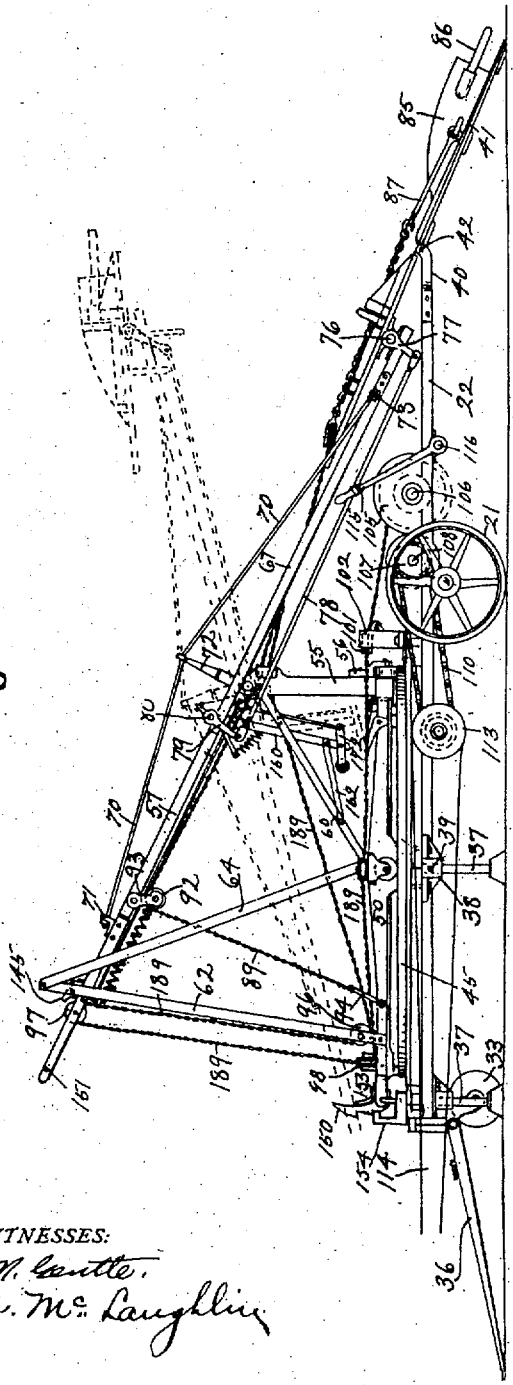

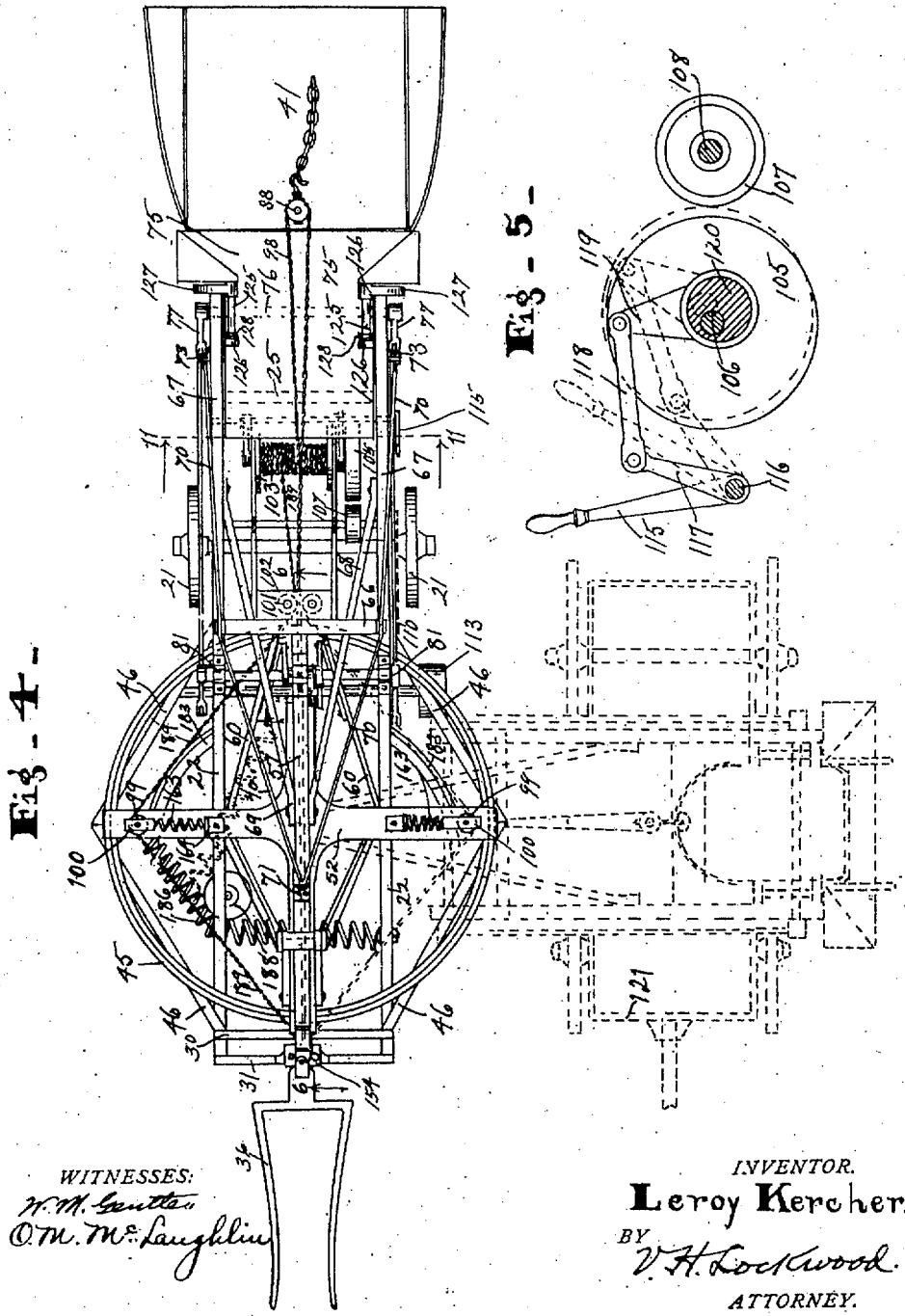

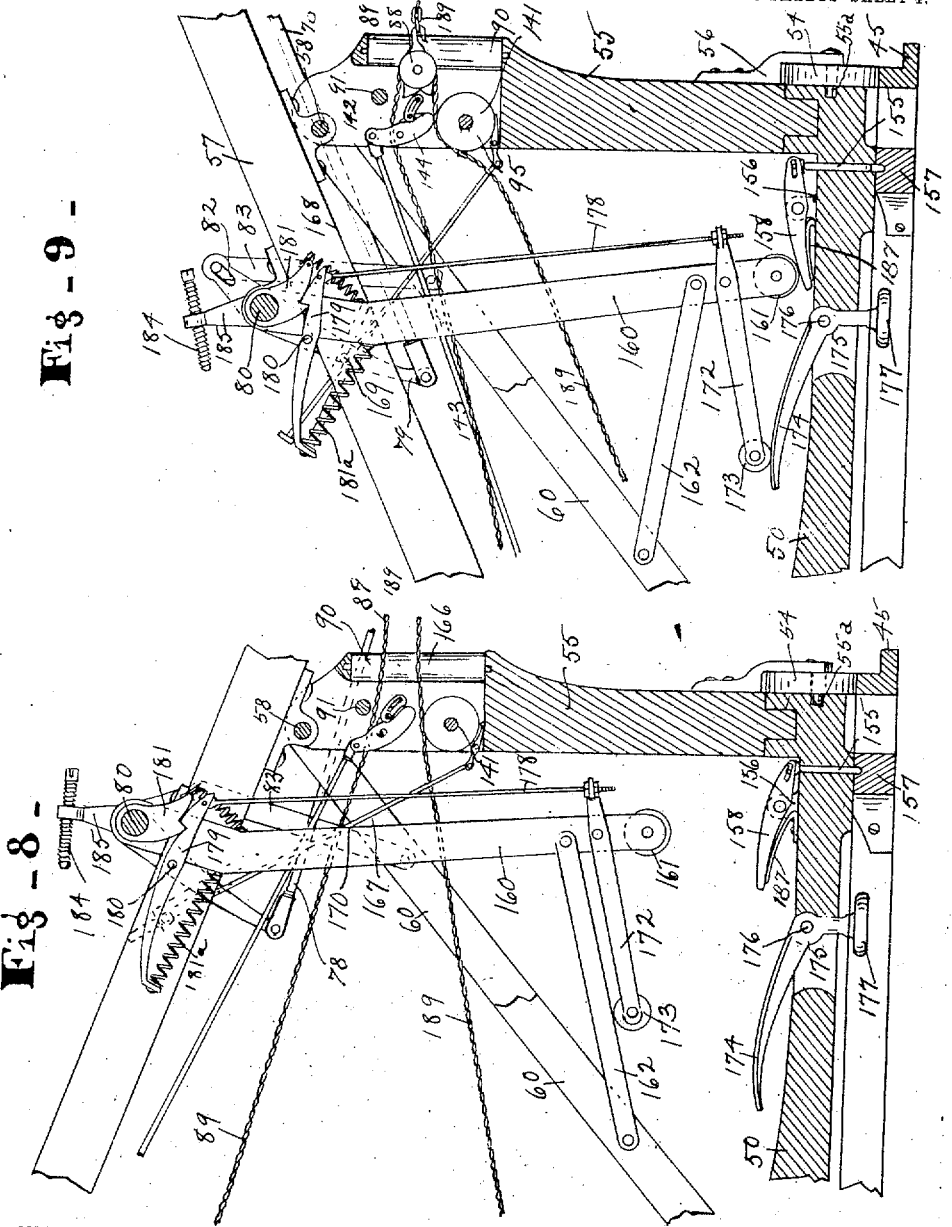

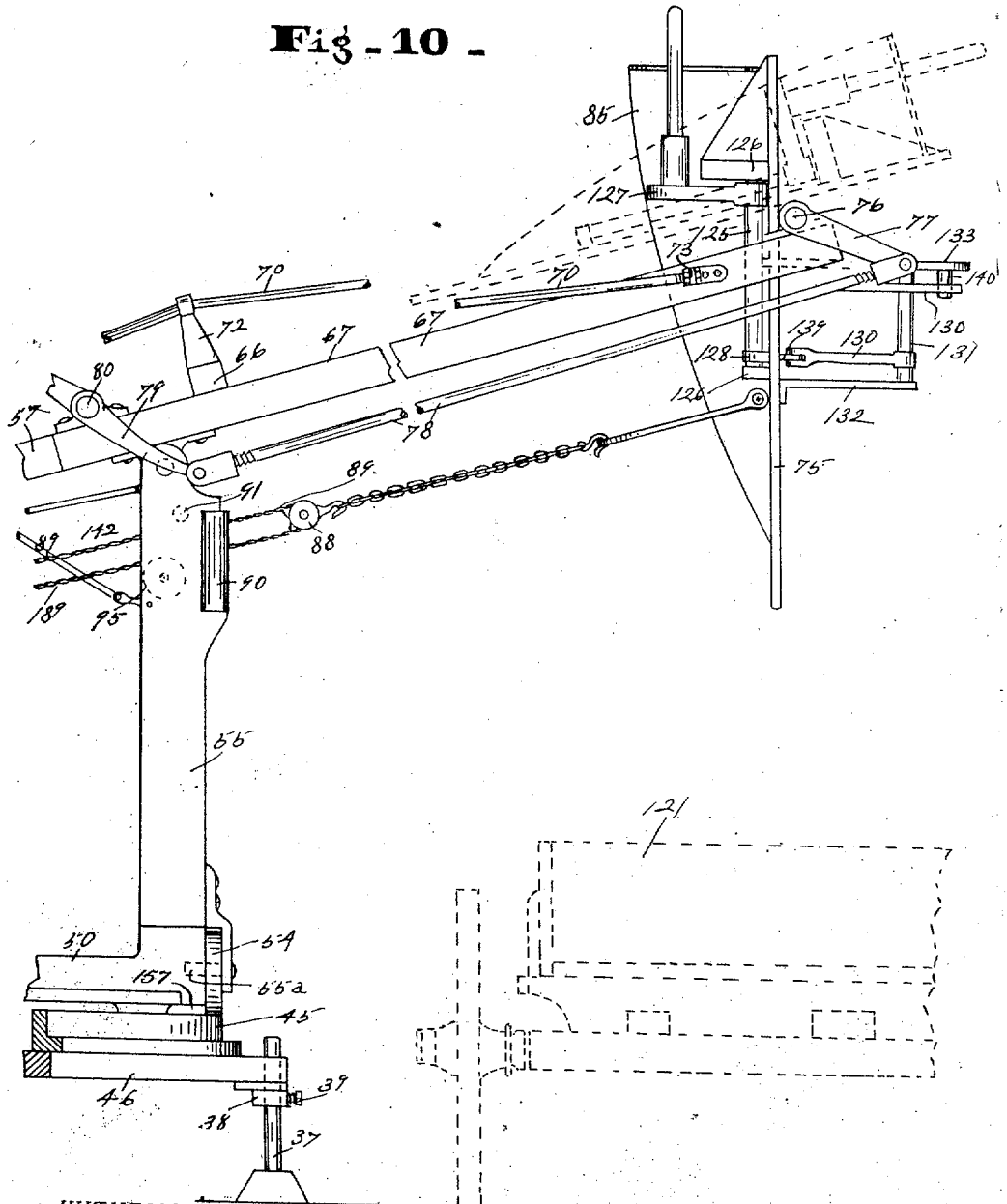

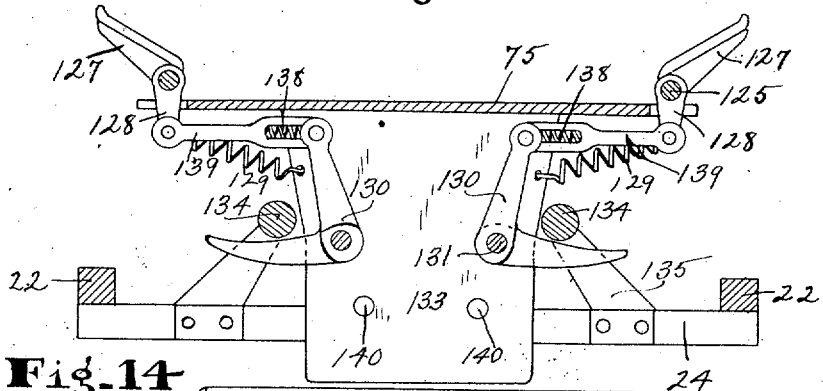
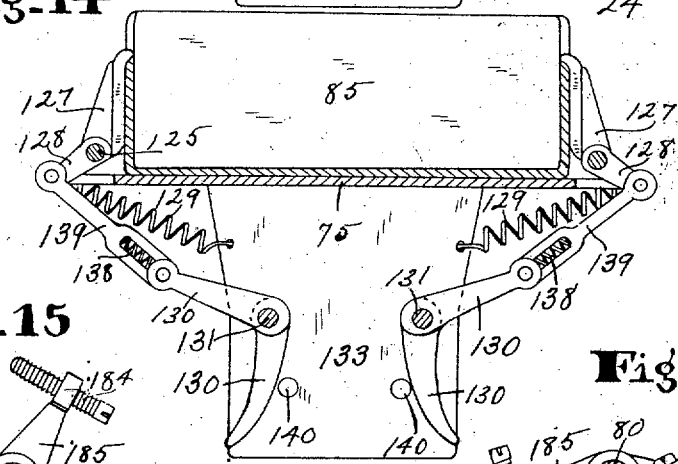
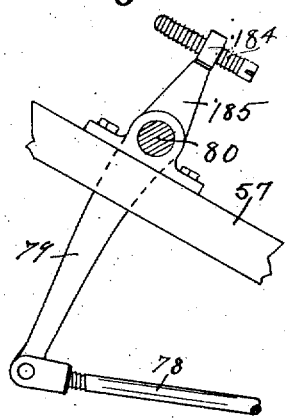
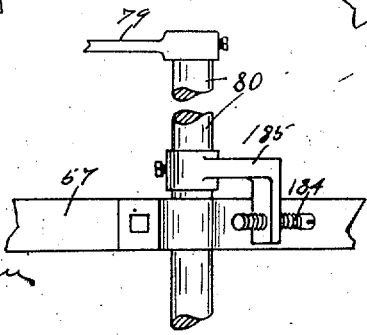
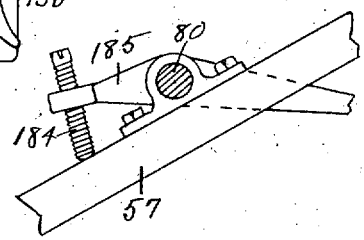

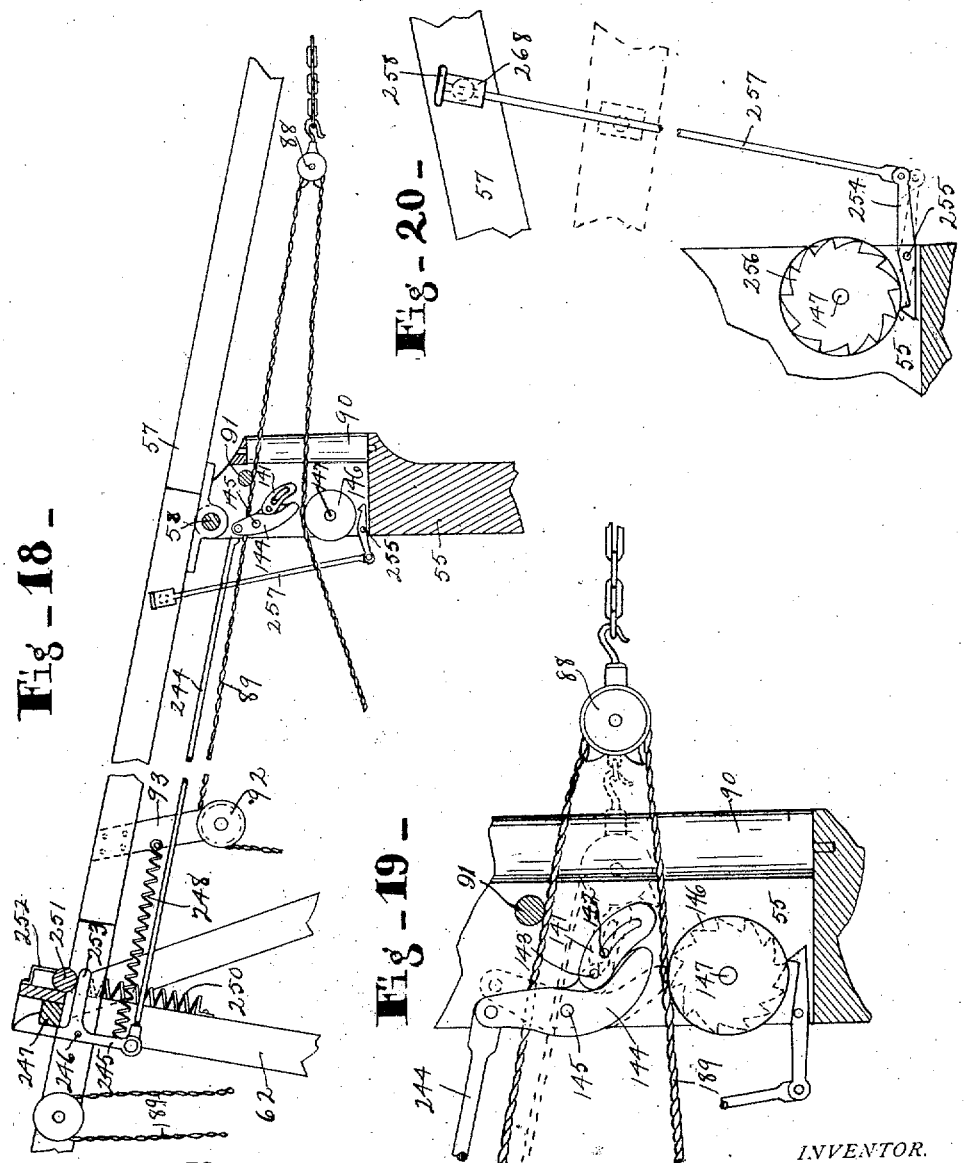

UNITED STATES PATENT OFFICE.

LEROY KERCHER, OF ROANN, INDIANA.

EXCAVATING AND LOADING MACHINE.

971,540.  Specification of Letters Patent.  Patented Oct. 4, 1910.

Application filed June 21, 1909. Serial No. 503,382.

*To all whom it may concern:*

Be it known that I, LEROY KERCHER, residing in the county of Miami and State of Indiana, my post-office address being Roann, county of Wabash, Indiana, have invented a certain new and useful Excavating and Loading Machine; and I do hereby declare that the following is a full, clear, and exact description thereof, reference being had to the accompanying drawings, in which like letters refer to like parts.

The object of this invention is to provide a machine for excavating gravel, sand, soil and the like.

The machine draws toward itself a scoop, or like excavating device, for receiving a load of gravel or the like, and draws the same upon a platform carried by a tilting frame that elevates and turns it laterally and dumps the contents of the scoop or the like, into a wagon, the scoop or the like being temporarily held in connection with the platform. A single means is employed for accomplishing the various steps in the operation above outlined, and only one cable is necessary to draw the scoop for excavating, pull it up on the platform, elevate the platform, revolve the turn-table, permit the dumping and return the same to the original position.

The full nature of the invention will be understood from the accompanying drawings and the following description and claims.

Figure 11:
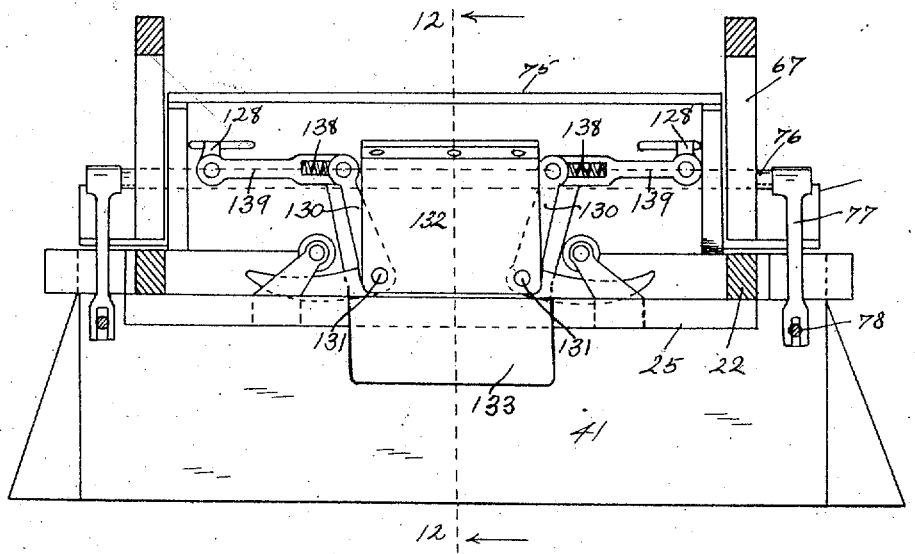
Figure 12:
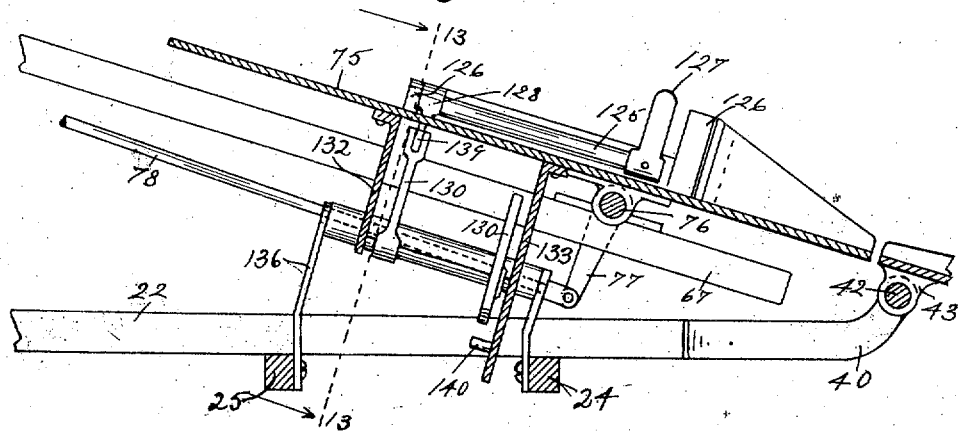

In the drawings Figure 1 is a side elevation of the machine showing it by full lines in its unoperated position and by dotted lines in position during the elevation of a scoop load of dirt or gravel. Fig. 2 is a plan view of the rear half of the machine with the tilting platform elevated and not shown, and other parts being removed and broken away. Fig. 3 is a section on the line 3—3 of Fig. 2. Fig. 4 is a plan view of the machine, the unoperated position being shown by full lines and the dumping position being shown by dotted lines, and also a wagon is shown by dotted lines. Fig. 5 is a section on the line 5—5 of Fig. 2. Fig. 6 is a central vertical section through the forward half of the machine on the line 6—6 of Fig. 4, parts being broken away and the tilting frame being shown by dotted lines. Fig. 7 is a section on the line 7—7 of Fig. 6, parts of the mechanism being omitted. Fig. 8 is the same as the right-hand end of Fig. 6 on a larger scale, parts being broken away, showing the tilting frame in its unoperated position. Fig. 9 is the same showing the tilting frame in its operated position. Fig. 10 is a side elevation of the tilting frame and means for supporting the same, showing the parts by full lines in the dumping position and by dotted lines in the position just before dumping, the tilting frame being broken away between its ends and a portion of the wagon below being shown by dotted lines. Fig. 11 is a section on the line 11—11 of Fig. 4. Fig. 12 is a section on the line 12—12 of Fig. 11. Fig. 13 is a section on the line 13—13 of Fig. 12 showing the means for clamping the scoop, with the scoop omitted. Fig. 14 is the same with the scoop in place and clamped. Fig. 15 is a detail of the means for stopping the tilting frame. Fig. 16 is a plan view of what is shown in Fig. 15. Fig. 17 is the same as the upper part of Fig. 15 with the parts in their operated position. Fig. 18 is a central vertical section of the upper forward portion of the device on a larger scale and parts being broken away. Fig. 19 is a similar view of the central portion of Fig. 18 on a larger scale, the operated position of the parts being shown by dotted lines. Fig. 20 is a detail view of the ratchet locking means shown in Fig. 18, parts being broken away and the operated position being indicated by dotted lines.

Upon the axle 20 carried by the ground wheels 21, the horizontal vehicle frame is mounted, consisting of two lateral beams or bars 22 extending almost the full length of the device, an intermediate parallel bar 23 extending throughout the forward half of the machine, and cross bars 24, 25, 27, 28, 29, 30, 31 and 32, see Fig. 6. Said frame at its front end is carried by a centrally located ground wheel 33 mounted in the lower end of the swivel frame 34 that is swiveled to the frame 35 secured to the forward end of the longitudinal bar 23 and the two front cross bars 31 and 32. To the lower cross bar 32 shafts 36 are connected, whereby a horse may be hitched to the device for changing the position of the machine. When positioned for work it is braced and steadied by the legs 37 that are vertical and adjustably mounted on the brackets 38 secured to the frame. Said legs are provided with holes and pins 39 are inserted through the brackets 38 and legs 37 so as to adjust the legs vertically in position to properly brace the machine, especially at the sides thereof, to prevent the machine from upsetting. There are two of these leg braces 37 at each side of the machine. To the rear end of the lateral bars 22 of the frame rearwardly projecting arms 40 are bolted and an inclined platform 41 mounted by means of the rod 42 that passes through said arms 40 and through bars 43 on which said platform is secured. The rear end of the platform rests on the ground, while the front end is mounted in connection with the frame so that its inclination is forwardly and upwardly. Upon the portion of the frame between the traction wheels 21 and 33 a circular track or rail 45 is secured upon the cross bars 27, 29 and 30 of the frame, see Fig. 6, and upon four inclined bars 46, two on each side of the machine. One bar at each side of the machine extends from the front cross bar 30 to the end of the cross bar 29, and the other from the cross bar 29 to the cross bar 27. The ends of said bars 46 adjacent the cross bars 27 and 30 rest and are secured upon the side frame bars 22. A turn table is mounted upon said circular track so as to be capable of being turned thereon. It consists of a frame 50 having four arms projecting at right angles to each other from a central point where the king-bolt 51 is located. This king-bolt extends through the turn table 50 and projects into a recess in the spider-like bearing frame 52, which is secured upon the central longitudinal frame bar 23 and cross frame bar 29. The ends of the arms of the front and side of the turn table 50 carry small rollers 53, and the rear arm carries a large roller 54 that ride upon the circular track 45 and support said turn table and permit its oscillations.

A derrick post 55 is rigidly mounted upon the rear end of the rear arm of the turn table 50, as shown in Fig. 6, and a bracket 56 is connected with it that overlaps the wheel 54 and carries one end of the spindle 55ª of said wheel, the other end of the spindle having bearing in the rear arm of the turn table 50. On the upper end of the derrick post 55 a tilting derrick frame is fulcrumed about midway between its ends by the fulcrum pin 58 passing through brackets 59, the central bar 57 of said tilting frame and through the upper end of the post 55. This enables the tilting bars 57 to be vertically oscillated but not horizontally oscillated on the post 55. The upper end of the post 55 is braced by braces 60 running therefrom to the laterally extending arms of the turn table near the center thereof, see Figs. 4 and 6.

The tilting or derrick frame consists of a main or a central bar 57 extending from the post 55 forwardly between a pair of upwardly extending guide bars 62 that are secured at their lower ends to the forwardly extending arm of the turn table 50 by the bolt 63, and at their upper ends they are held in place by braces 64, see Fig. 1, which extend therefrom down at a lateral inclination to a point about midway of the laterally extending arms of the turn table 50. There is a stop lock 65 between the upper ends of the guide bars 62, which limits the upward movement of the forward end of the derrick frame. About midway of the derrick frame and on the rear end of the bar 57 there is a cross bar 66 secured, to the ends of which laterally extending bars 67 are secured. The bars 67 are substantially parallel and there are brace bars 68 connected at their forward ends to the bar 57 about midway thereof at 69, see Fig. 4, and extending under the cross bar 66 and secured thereto and projecting rearwardly to a point about midway between the ends of the bars 67 and secured thereto. There are also truss rods 70 extending from the top of the bar 57 at the point marked 71, see Fig. 4, and passing over posts 72 extending upwardly from the ends of the cross bar 66 and then rearwardly to the point 73 near the rear ends of the bars 67.

A platform 75 is pivotally mounted on the rear end of the tilting frame so as to be connected with and in a sense form a part thereof. This platform is rigidly secured on the cross rod 76 which is mounted in bearings on the rear ends of the bars 67. Said platform 75 is oscillatable independently of the tilting frame by means of the crank 77 that is rigidly secured on the rod 76 and has connected with it a rod 78 extending forwardly to the crank 79 which is secured on the end of a rod 80 mounted in bearings 81 on the forward ends of the bars 67 and in front of the cross bars 66. Said rod 80 has an arm 82 rigidly secured to it, see Fig. 9, which is slotted at its outer end and pivoted to a bar 83 that at its lower end is pivoted to one of the braces 60. Through the mechanism just described the platform is controlled and maintained, during the tilting movements of the tilting frame, so as to be so nearly horizontal that it will safely hold and support on it the scoop 85 loaded with dirt. The scoop 85 is substantially like ordinary road scrapers and it is provided with a handle 86 at the rear end and hitch bar 87 at the front end, and it is drawn up on the platform 75 by the block and tackle 88 connected with the hitch bar 87, and a cable 89, which extends forwardly between two vertically disposed rollers 90 mounted in the rear upper part of the post 55, and under a horizontal roller 91 in the upper part of the post 55, and over a pulley 92 on the arm 93 that is secured to the bar 57 of the tilting frame about midway thereof, and down to the clevis 94 that is secured to the forward arm of the turn table 50 about midway of its end, as shown in Fig. 1. The other end of the cable 89, which for distinction is numbered 189, passes forwardly between the vertical rollers 90 over a pulley 95 in the upper end of the post 55 under a pulley 96 in the lower end of a pair of guide bars 62 and thence up over a pulley 97 in the forward end of the tilting frame and down under a pulley 98 swiveled on the front end of the forward arm of the turn table 50 and thence laterally about a pulley 99 mounted in a swiveled frame 100 on one of the laterally extending arms of the turn table 50, as shown in Fig. 4, and then rearwardly about the pulley 101 on the frame 102 to the windlass 103, which is mounted in connection with two longitudinal bars 104 which extend between the cross frame bars 27 and 25, see Fig. 2. The windlass 103 is driven by the pulley 105 on the driven shaft 106, see Fig. 5, and which is adapted to frictionally engage the pulley 107 on the shaft 108, which carries a sprocket wheel 109, from which a chain 110 runs to a sprocket wheel 111 on the driving shaft 112 which carries a pulley 113, to which power is supplied by a belt 114 running from any suitable source of power. The pulley 105 is moved into frictional engagement with pulley 107 by lever 115, which is secured on the rod 116, which is mounted under the longitudinal bars 104 and has an arm 117 secured to it and which is connected with a bar 118 to arms 119 secured to the eccentrics 120 that are suitably mounted in bearings on the bars 104, so that when the handle 115 is thrown from the full line position shown in Fig. 5 to the dotted line position, it will bring said pulley 105 into engagement with the pulley 107. In this manner the mechanism is thrown out of gear or operation.

It is observed that there is only one cable composed of the parts numbered herein 89 and 189, and that cable is actuated by the windlass or drum 103 and performs several functions; namely, it draws the scoop 85 over the surface of the ground to get a load and pulls it on the platform 75, and then tilts the tilting frame by pulling it forwardly and downwardly, and then turns the turn table so as to move the load of dirt over the wagon 121, which is shown by dotted lines. When the scoop 85 has been loaded with dirt and drawn up on the platform 75, it is held thereon by means shown in Figs. 13 and 14. At each side of the platform 75 there is a rod 125 mounted in bearings 126. On said rods 125 there are arms 127 adapted to engage the sides of the scoop 85, as shown in Fig. 14. They are actuated by means of the cranks 128 on the rods 125, and the connecting bars 139 and the bell-crank-shaped trips 130 fulcrumed on the rod 131 mounted in the bearing board 132, which extends downwardly from the platform 75, see Figs. 11 and 12, and another board 133 extending down from said platform at the rear of the board 132. Said board 133 is tapering, as shown in Fig. 13, and as the rear end of the tilting frame descends, it passes between two rollers 134 mounted on rigid arms 135 on the cross piece 24. The forward ends of said rollers 134 are mounted in arms 136 extending up from the cross piece 25, see Fig. 12. The connecting rod 139 has a spring 138 in it and there is a spring 129 between the arm 128 and the board 133. When the scoopful of dirt is first drawn upon the platform 75, the load-holding mechanism is as shown in Fig. 13, one end of the bell-crank trip 130 being below the rollers 134. In the first part of the operation of the tilting frame for elevating the load of dirt, said rollers 134 throw the bell crank levers 130 into the position shown in Fig. 14, until they are stopped by the stop pins 140 in the board 133. Such movement of the trip levers 130 throws the arms 127 into engagement with the scoop 85 and throws the upper ends of the lever trips 130 and the connecting bar 139 past center so as to lock the arms 127 tightly in engagement with the scoop 85, and in that manner said scoop is held until after it has been dumped and the tilting frame is being returned to its original position. As the rear end of said frame descends, the upper arm of the lever trips 130 strike against the rollers 134, whereby said trip levers are changed from the position shown in Fig. 14 to that shown in Fig. 13. That releases the arms 127 from the scoop and the spring 139 draws said arms to the open position, as shown in Fig. 13. Then the scoop 85 can be drawn rearwardly for another load of gravel or dirt.

After the scoop 85 loaded with dirt has been deposited on the platform 75, and the cable is drawn by the drum for elevating and dumping the load of dirt, the pulley block 88 over which the cable passes will be gradually drawn forwardly from the position indicated in Figs. 1 and 18 to the dotted line position shown in Fig. 19, when said pulley block engages the bar 141, which is longitudinally slotted so as to ride on the pin 142 in the frame post 55, and which is pivoted at its front end at 143 to the locking lever 144 at a point below the fulcrum of the latter. Said locking lever 144 is fulcrumed between its ends at 145 to said post 55. The effect, therefore, of such movement of the block 88 is to throw the lower end of the locking lever 144 into pinching engagement with the lower part of the cable 189 and pinch it against the pulley 146, which is mounted on the pin 147 in the frame post 55. That will lock the cable so that during the further operation of the device for lifting and dumping the load of dirt, the other parts 80 of the cable will be slack and permit the various movements to the forward end of the tilting frame 57. Said movement of the locking lever 144 causes its upper end to draw rearwardly the connecting rod 244 that is pivoted to the lever 245 near the forward end of the tilting frame, and that is fulcrumed at the point 246 thereon between its ends and has a catch at the upper end thereof to engage the cross piece 247 at the upper end of the frame bar 62. A spring 248 extends from the lower part of the trip lever 245 to the arm 93 that carries the pulley 92, so that said spring tends to release the trip lever 245 while another spring 250 tends to hold said trip lever in engagement. Said spring is fastened at its lower end to the post 62 and at its upper end to a transversely extending roller 251 that is vertically slidable within the guide 252 in the upper part of the post 62 and bears on an arm 253 from the middle portion of the trip lever 245. The upper end of said trip lever 245 is beveled, so that as the forward end of the tilting frame is elevated it will slip by the cross piece 247 into locking position. The pulley 146 is also locked and held in position to assist in holding the cable by the catch lever 254, which is fulcrumed at 255 to the post 55 and engages the ratchet wheel 256, which is secured to the inside of the pulley 146. The catch lever 254 is operated by a rod 257 that slides through a block 268 on the tilting bar 57 at a point forward of the fulcrum thereof, and said rod has a head 258 on it so that when the forward end of the tilting frame moves upwardly to its limit of movement, it will elevate the rod 257 and disengage the catch lever 254 from the ratchet wheel 256 and release the cable at the same time that the spring 248 acting on the trip lever 245 returns the rod 244 and locking lever 144 to their normal unlocking position. But when the forward end of the tilting frame moves downwardly to the dotted line position, as shown in Fig. 20, the gravity of the rod 257 and the forward end of the catch lever 254 causes the catch end of said lever to engage the end of the ratchet 256 and hold it in locked position until the tilting frame is returned to its normal position. After the tilting frame has been operated to the dotted line position shown in Fig. 6, a latch 150 pivoted on the forward arm of the turn table 50 catches the pin 151 in the forward end of the tilting frame and holds said tilting frame in its tilting position. Said latch 150 is actuated by a spring 152. The latch 150 has a lower projection 153 that abuts against a wall on the forward arm of the turn table 50 so as to limit the outward movement of said latch.

Said outward movement is also limited by a frame 154 secured on the forward part of the stationary frame of the machine.

The turn table is locked when the tilting frame is in position for receiving a scoopful of the dirt, that is, when in the position shown in Fig. 6, by a pin 155 that projects through the rear arm of the turn table into a recess in the block 157 secured to the frame below. The pin 155 is pivoted to a lever 158 fulcrumed in the bracket 156 secured to the rear arm of the turn table, as seen in Fig. 9. As the tilting frame is being actuated for elevating the scoopful of dirt, from the position shown in Fig. 8 to the position shown in Fig. 9, said pin 155 is released by the engagement with it of the bar 160 that extends down from a rod 80 and has on its lower end a roller 161 which rides on the forward end of the lever 158 and actuates it. Said bar 160 is directed in its movements by the connecting bar 162 which is pivotally connected at one end to the bar 160 and at the other end to a brace 60. This enables the tilting frame during its tilting movement to release the turn table, whereby the turn table, tilting frame and scoopful of dirt can be turned. When the turn table is released, as explained, the pull on the end of the cable 189 will cause the turn table to turn. This action of the cable 189 will appear by examining Fig. 4, and the dotted lines in that figure illustrate the position into which it will turn the mechanism. To prevent the wear of the cable 189 the housings 100, in which the pulleys 99 are mounted, are held normally in the outer position by springs 163, which are connected at one end to said housing and at the other end to the lateral arms of the turn table. When the load of dirt has been turned to the dotted line position shown in Fig. 4, the platform 75 with the scoop 85 secured thereto is dumped, the forward end thereof turning downwardly by force of gravity, so that the contents will discharge into the wagon 121 below. The dumping movement of the platform is permitted by the release of the trip 179 from the arm 181, which permits the shaft 80 to turn somewhat farther than is shown in Fig. 9, that is, until the arm 82 moves from the position shown in Fig. 9 far enough to cause the bar 83 to engage and be stopped by the shaft 80. This movement of the shaft 80 permits a sufficient movement of the arm 79 and connecting rod 78 to give the platform a dumping movement, for the arm 79 is longer than the arm 77 on the dumping platform, as appears in Fig. 10. When the tilting frame has been moved from the position shown in Fig. 8 to that shown in Fig. 9, and the bar 160, heretofore described, moves to its downward position, it carries a lever 172, which is fulcrumed on said bar into position for the roller 173 on the bar 172 to ride upon the end of the trip lever 174 that extends through a slot 175 in the rear arm of the turn table 50 and is pivoted thereto at 176 and has a wheel 177 on its lower end. The rear end of the lever 172 is connected to a rod 178 which runs up and is pivoted to a trip lever 179 fulcrumed to the bar 160 at 180. The trip lever 179 catches a trip bar 181, which is secured on the shaft or rod 80. A spring 181ª, which extends from the free end of the trip lever 179 to the bar 160, holds said trip lever in engagement with said trip arm 181. The purpose of this locking construction is to hold the platform 75 during the tilting and oscillation of the tilting frame in a substantially horizontal position through the means heretofore described, including the shaft 80, arm 79, rod 78, arm 77 and rod 76.

As the turn table is being turned to carry the scoop containing the dirt over the wagon in order to dump the same, the roller 177 in the lower end of the trip lever 174, which is shown in Fig. 8, comes in engagement with a cam-shaped bar 183, which is secured under the turn table to the frame of the machine at each side of the center of the turn table. The position of this cam appears in Fig. 4, and it is arranged so as to actuate said trip lever 174 and throw the upper end thereof upwardly so as to cause the lever 172 and rod 178 to disengage the trip lever 179 from the trip arm 181. This releases the means which has been holding the platform 75 substantially horizontal and permits gravity to cause said platform to dump. The oscillation of the rod 80, caused by the dumping by said platform 75, is limited by the set screw 184 in the arm 185 secured on said rod 80, coming in contact with the bar 57 of the tilting frame, as shown in Fig. 17. The position of said parts before the actuation of the tilting frame is indicated in Figs. 15 and 16, and the position thereof after the load has been dumped is indicated in Fig. 17. After the scoop and platform have been dumped and the dirt discharged into the wagon below, the lever 115 is operated and the windlass thrown out of gear, that is, the wheel 105 is disengaged from the wheel 107, as shown in Fig. 5, so that there will be no pull on the cable, and then the spring 186, shown in Fig. 4, will return the turn table until the pin 155, shown in Fig. 9, is moved into the locking position shown in Fig. 8 by the spring 187 acting on the lever 158. That stops the return movement of the turn table and the block 157 is inclined on both ends as shown at one end in Fig. 6 to permit the turn table to move up on to the middle position. The spring 186 is connected to one of the side bars 22 of the frame and passes over a pulley 188 mounted in connection with the other side bar 22, and at its other end is secured to one of the lateral arms of the turn table. As the turn table is returned to its normal position, the catch 150 at the front of the machine is released by hand from the pin 151 on the part 57 of the forward end of the tilting frame, and then the rear end of the tilting frame descends by gravity, and the board 133, see Fig. 13, passes between the rollers 134 and said rollers 134 strike the upper part of the levers 130 and move them from the position shown in Fig. 14 to that shown in Fig. 13, which releases the scoop 85. The scoop is then drawn rearwardly and placed in position to pick up another load of dirt or gravel. The platform 75 containing the scoop is returned from its dumped position, as shown in Fig. 10 by full lines, to its normal position, as indicated in Fig. 1, while the tilting frame is oscillated from the position shown in Fig. 10 to that shown in Fig. 1.

Referring to Fig. 9, it is observed that the bar 83, which is connected at its lower end with the stationary bars 60, is at its upper end pivoted to the arm 82, which is secured to the shaft 80 to which the arm 79 is rigidly secured, and that arm is connected with the rod 78 which is connected with the arm 77 that is rigidly secured to the shaft 76 and that in return is rigidly secured to the platform 75. Hence when the forward end of the tilting frame is elevated, it is obvious that the bar 83 acting on the shaft 80 will throw the arm 79 from the position shown in Fig. 10 to that shown in Figs. 8 and 15 and that will return the scoop platform to its normal position.

What I claim as my invention and desire to secure by Letters Patent is:

1. A machine of the kind described including a platform, a tilting frame with which said platform is connected for elevating the same, means for revolving said frame and platform, and means for drawing a scoop over the surface of the ground for excavating, pulling it up on said platform, tilting the frame and actuating said revolving means.

2. A machine of the kind described including a platform, a tilting frame with which said platform is connected for elevating the same, means for revolving said frame and platform, a cable for drawing a scoop over the surface of the ground for excavating, pulling it up on said platform, tilting the frame and actuating said revolving means, and means for operating said cable.

3. A machine of the kind described including a platform, a tilting frame with which said platform is connected for elevating the same, means for revolving said frame and platform, a cable for drawing a scoop over the surface of the ground for excavating, pulling it up on said platform, tilting the frame and actuating said revolving means, means for operating said cable, and releasable means mounted in connection with said platform for engaging and holding said scoop in place thereon.

4. A machine of the kind described including a stationary frame, a turn table revolubly mounted thereon, a tilting frame mounted upon the turn table, a platform mounted at the rear end of the tilting frame and its rear edge adapted when the frame is tilted to rest upon the ground, a scoop for excavating, a cable for drawing said scoop while excavating, pulling the same upon said platform, tilting said frame and revolving said turn table, and means for operating said cable.

5. A machine of the kind described including a stationary frame, a turn table revolubly mounted thereon, a tilting frame mounted upon the turn table, a platform mounted at the rear end of the frame and its rear edge adapted when the frame is tilted to rest upon the ground, a scoop for excavating, a cable for drawing said scoop while excavating, pulling the same upon said platform, tilting said frame and revolving said turn table, means for operating said cable, spring actuated means for locking said turn table to the frame when the same is in its position during excavation, and means operated by the tilting of said tilting frame for releasing said locking means.

6. A machine of the kind described including a stationary frame, a turn table revolubly mounted thereon, a tilting frame mounted upon the turn table, a platform mounted at the rear end of the frame and its rear edge adapted when the frame is tilted to rest upon the ground, a scoop for excavating, a cable for drawing said scoop while excavating, pulling the same upon said platform, tilting said frame and revolving said turn table, means for operating said cable, spring actuated means for locking said turn table to the frame when the same is in its position during excavation, a bar projecting downwardly from said tilting frame, and means for guiding said bar into engagement with said locking means, whereby when the tilting frame is tilted for elevating the load said turn table locking means will be released.

7. A machine of the kind described including a stationary frame, a turn table revolubly mounted thereon, a tilting frame mounted upon the turn table, a platform mounted at the rear end of the frame and its rear edge adapted when the frame is tilted to rest upon the ground, a scoop for excavating, a cable for drawing said scoop while excavating, pulling the same upon said platform, tilting said frame and revolving said turn table, means for operating said cable, mechanism mounted in connection with said platform for engaging said scoop and for holding it on the platform, and means in connection with the stationary frame for engaging said scoop holding mechanism for actuating the same when the platform rises and releasing the same when the platform descends.

8. A machine of the kind described including a stationary frame, a turn table revolubly mounted thereon, a tilting frame mounted upon the turn table, a platform mounted at the rear end of the frame and its rear edge adapted when the frame is tilted to rest upon the ground, a scoop for excavating, pulling the same upon said platform, tilting said frame and revolving said turn table, means for operating said cable, a pair of rods mounted in connection with the stationary platform near the rear end, a tapering plate extending downwardly from said platform and arranged to move between said rods, arms pivotally mounted at the sides of said platform for engaging the scoop and holding it thereon, bell-crank-shaped trip levers pivoted on said vertical plate in position for one arm of each lever to engage said rods, and a connecting bar between said trip levers and said holding arms, the parts being arranged so that when the holding arms are actuated, the connection between said trip levers and the connecting bars will pass beyond a straight line between the fulcrum of said trip levers and the connection between said arms and connecting rod, whereby said arms will continue to hold the scoop until said trip levers are operated in the return direction.

9. A machine of the kind described including a stationary frame, a turn table revolubly mounted thereon, a tilting frame mounted upon the turn table, a platform pivotally and transversely mounted on the rear end of the frame so as to be vertically oscillatable, means mounted in connection with the portion of the tilting frame in front of the fulcrum thereof for regulating the oscillatory movement of said platform and holding it in position, a scoop for excavating, a cable for drawing said scoop while excavating, pulling the same upon said platform, tilting said frame and revolving said turn table, and means for operating said cable.

10. A machine of the kind described including a stationary frame, a turn table revolubly mounted thereon, a tilting frame mounted upon the turn table, a platform pivotally and transversely mounted on the rear end of the frame so as to be vertically oscillatable, a crank mounted in connection with the fulcrum of said platform, a lever fulcrumed on said tilting frame in front of the point at which the tilting frame is fulcrumed, a connecting rod between said crank and lever, means for temporarily locking said lever from movement for holding the platform in a substantially horizontal position, and means controlled by the movement of the turn table for releasing said lever locking means, whereby the platform may dump by gravity.

11. A machine of the kind described including a stationary frame, a turn table revolubly mounted thereon, a tilting frame mounted upon the turn table, a platform pivotally and transversely mounted on the rear end of the frame so as to be vertically oscillatable, a crank mounted in connection with the fulcrum of said platform, a lever fulcrumed on said tilting frame in front of the point at which the tilting frame is fulcrumed, a connecting rod between said crank and lever, means for temporarily locking said lever from movement for holding the platform in a substantially horizontal position, means controlled by the movement of the turn table for releasing said lever locking means, whereby the platform may dump by gravity, and a stop for limiting the oscillatory movement of said lever.

12. A machine of the kind described including a stationary frame, a turn table revolubly mounted thereon, a tilting frame mounted upon the turn table, a platform pivotally and transversely mounted on the rear end of the frame so as to be vertically oscillatable, a crank mounted in connection with the fulcrum of said platform, a lever fulcrumed on said tilting frame in front of the point at which the tilting frame is fulcrumed, a connecting rod between said crank and lever, means for temporarily locking said lever from movement for holding the platform in a substantially horizontal position, means controlled by the movement of the turn table for releasing said platform locking means, whereby the platform may dump by gravity, a lever mounted in said turn table with one end extending below the same and the other end above the same, a cam mounted in connection with the stationary frame arranged to be engaged by the lower end of said lever, and means arranged to be actuated by the upper end of said lever for releasing said lever locking means.

13. A machine of the kind described including a stationary frame, a turn table revolubly mounted thereon, a post extending upwardly from the rear portion of said turn table, a tilting frame mounted upon the upper end of said post, a platform mounted at the rear end of the frame and its rear edge adapted when the frame is tilted to rest upon the ground, a scoop for excavating, a cable connected at one end to the forward portion of the turn table, a windlass to which the other end of said cable is connected and whereby the cable is operated, a pulley in connection with the tilting frame away from the forward end thereof and over which said cable passes, a pulley in connection with said scoop about which said cable passes, a pulley mounted in the upper portion of said post over which said cable passes, a pulley in connection with said turn table under which said cable passes, a pulley on the forward end of the tilting frame over which said cable passes, a pulley on the extreme forward end of the turn table under which said cable passes, and a pulley on a lateral portion of said turn table about which said cable passes, whereby said cable will move the scoop for excavating, draw it up on the platform, tilt the tilting frame and revolve the turn table.

14. A machine of the kind described including a stationary frame, a turn table revolubly mounted thereon, a tilting frame mounted upon the turn table, a platform mounted at the rear end of the frame and its rear edge adapted when the frame is tilted to rest upon the ground, a scoop for excavating, a cable for drawing said scoop while excavating, pulling the same upon said platform, tilting said frame and revolving said turn table, means for operating said cable, and means controlled by the cable and tilting movement of said tilting frame for locking said cable between its ends to elevate the load, whereby the remaining pull on the cable will act only on the turn table.

15. A machine of the kind described including a stationary frame, a turn table revolubly mounted thereon, a post extending upwardly from the rear portion of said turn table, a tilting frame mounted upon the upper end of said post, a platform mounted at the rear end of the frame and its rear edge adapted when the frame is tilted to rest upon the ground, a scoop for excavating, a cable connected at one end to the forward portion of the turn table, a windlass to which the other end of said cable is connected and whereby the cable is operated, a pulley in connection with the tilting frame away from the forward end thereof and over which said cable passes, a pulley in connection with said scoop about which said cable passes, a pulley mounted in the upper portion of said post over which said cable passes, a pulley in connection with said turn table under which said cable passes, a pulley on the forward end of the tilting frame over which said cable passes, a pulley on the extreme forward end of the turn table under which said cable passes, a pulley on a lateral portion of said turn table about which said cable passes, whereby said cable will move the scoop for excavating, draw it up on the platform, tilt the tilting frame and revolve the turn table, a shoe pivoted in the upper end of said post arranged to engage the cable and lock it on the pulley in said post, and means controlled by the cable and tilting movement of the tilting frame for moving said shoe to its locking position when the load has been elevated, whereby the portion of said cable connected with the scoop will become slack to enable the scoop to dump.

16. A machine of the kind described including a stationary frame, a turn table revolubly mounted thereon, a tilting frame mounted upon the turn table, a platform mounted at the rear end of the frame and its rear edge adapted when the frame is tilted to rest upon the ground, a scoop for excavating, a cable for pulling the same up on said platform, tilting said frame and revolving said turn table, means for operating said cable, means for locking the forward end of said tilting frame in its upper position, and means controlled by said cable for releasing said locking means.

17. A machine of the kind described including a stationary frame, a turn table revolubly mounted thereon, a post extending upwardly from the rear portion of said turn table, a tilting frame mounted upon the upper end of said post, a platform pivotally mounted on said frame and its rear edge adapted when the frame is tilted to rest upon the ground, a scoop for excavating, a cable connected at one end to the forward portion of the turn table, a windlass to which the other end of said cable is connected and whereby the cable is operated, a pulley in connection with the tilting frame away from the forward end thereof and over which said cable passes, a pulley in connection with said scoop about which said cable passes, a pulley mounted in the upper portion of said post over which said cable passes, a pulley in connection with said turn table under which said cable passes, a pulley on the forward end of the tilting frame over which said cable passes, a pulley on the extreme forward end of the turn table under which said cable passes, a pulley on a lateral portion of said turn table about which said cable passes, whereby said cable will move the scoop for excavating, draw it up on the platform, tilt the tilting frame and revolve the turn table, a frame extending upwardly from the forward part of the turn table for vertically guiding the forward end of the tilting frame, a locking means on said tilting frame arranged to engage the upper part of said guide frame and locking the forward end of the tilting frame in its upper position, a bar extending rearwardly from said locking means, and a lever mounted at the upper end of said post, one end of said lever connected with said connecting rod and means controlled by said cable for actuating the other end of said lever.

18. A machine of the kind described including a platform, a tilting frame with which said platform is connected for elevating the same, means for revolving said frame and platform, means for drawing a scoop over the surface of the ground for excavating, pulling it up on said platform, tilting the frame and actuating said revolving means, means for causing said scoop to dump after it has been elevated, and means for holding the scoop on the platform while it is being elevated, dumped and returned to its original position.

19. A machine of the kind described including a platform, a tilting frame with which said platform is connected for elevating the same, means for revolving said frame and platform, a cable for drawing a scoop over the surface of the ground for excavating, pulling it up on said platform, tilting the frame and actuating said revolving means, means for operating said cable, and means for locking said cable intermediately of its ends, so that only one end thereof will receive strain and the other end will be slack.

20. A machine of the kind described including a platform, a tilting frame with which said platform is connected for elevating the same, means for revolving said frame and platform, a cable for drawing a scoop over the surface of the ground for excavating, pulling it up on said platform, tilting the frame and actuating said revolving means, means for operating said cable, a block and tackle connected with said scoop over which the cable passes, and means for locking the cable intermediately of its ends that is actuated by said block and tackle after it is moved while the scoop is being drawn up on the platform.

21. A machine of the kind described including a platform, a tilting frame with which said platform is connected for elevating the same, means for revolving said frame and platform, a cable for drawing a scoop over the surface of the ground for excavating, pulling it up on said platform, tilting the frame and actuating said revolving means, means for locking the forward end of the tilting frame when in its upper position, means for operating said cable, means for locking said cable intermediately of its ends, so that only one end thereof will receive strain and the other end will be slack, and mechanism controlled by said cable locking means for disengaging the forward end of the tilting frame when said locking means is operated.

22. A machine of the kind described including a platform, a tilting frame with which said platform is connected for elevating the same, means for revolving said frame and platform, a cable for drawing a scoop over the surface of the ground for excavating, pulling it up on said platform, tilting the frame and actuating said revolving means, means for locking the forward end of the tilting frame when in its upper position, means for operating said cable, means for locking said cable intermediately of its ends, so that only one end thereof will receive strain and the other end will be slack, mechanism controlled by said cable locking means for disengaging the forward end of the tilting frame when said locking means is operated, and a spring for returning said locking mechanism to its unlocking position.

In witness whereof, I have hereunto affixed my signature in the presence of the witnesses herein named.

LEROY KERCHER.

Witnesses:
O. M. McLaughlin,
W. M. Gentle.